No. 711,864. Patented Oct. 21, 1902.
J. JACKSON.
CATTLE GUARD GATE.
(Application filed Aug. 1, 1902.)
(No Model.)
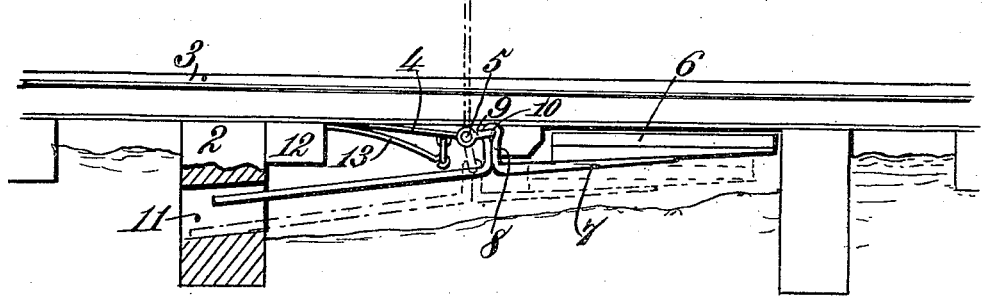
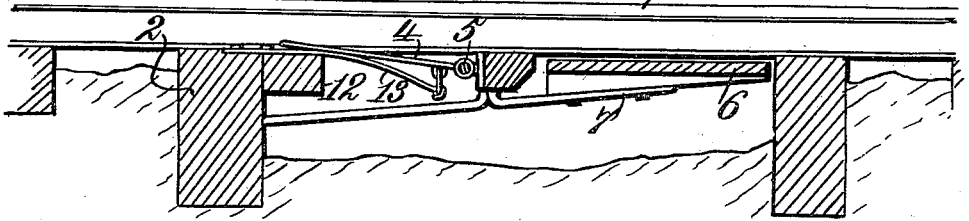
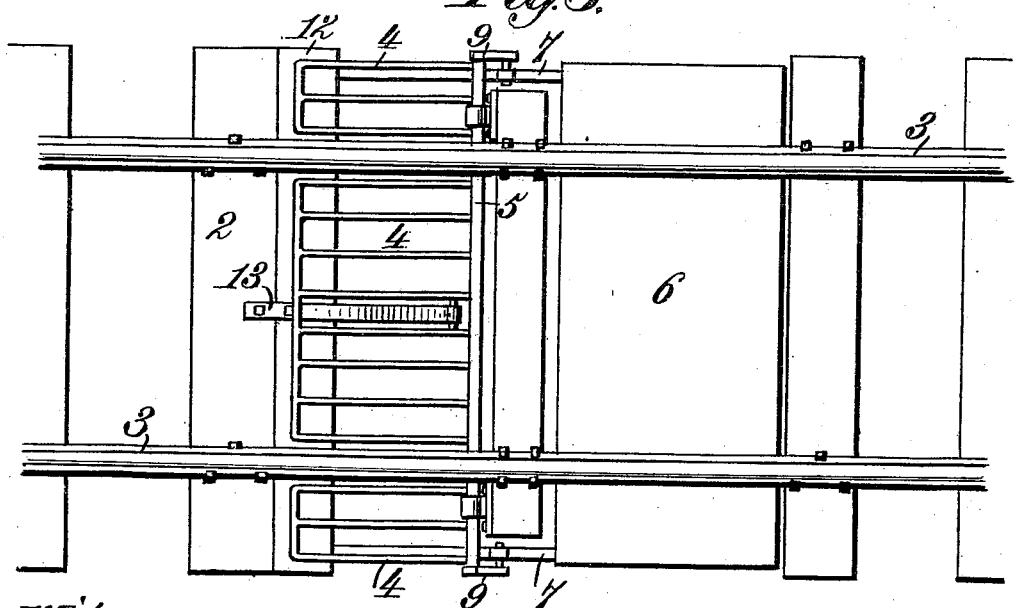
Witnesses.
Inventor.
John Jackson,
By James L. Norris.
Att'y.
THE NORRIS PETERS CO., PHOTO-LITHO., WASHINGTON, D. C.

UNITED STATES PATENT OFFICE.

JOHN JACKSON, OF GRANDCANE, LOUISIANA.

CATTLE-GUARD GATE.

SPECIFICATION forming part of Letters Patent No. 711,864, dated October 21, 1902.

Application filed August 1, 1902. Serial No. 118,022. (No model.)

*To all whom it may concern:*

Be it known that I, JOHN JACKSON, a citizen of the United States, residing at Grandcane, in the parish of De Soto and State of Louisiana, have invented new and useful Improvements in Cattle-Guard Gates, of which the following is a specification.

This invention relates to a cattle-guard gate of that kind wherein the gate is thrown into an upright position by virtue of connections with a movable platform which is depressed by the animal stepping on the same; and the object of the invention is to provide a simple apparatus of this character wherein the gate can be instantly operated by the animal and which can be readily and inexpensively installed.

The improved gate comprises in its construction a rock-shaft to which said gate is connected and a platform mounted for rising-and-falling movement and having a rod, said rod being suitably guided at its free end and having at a suitable point an upwardly-extending projection connected with a crank on said rock-shaft. In order to secure even motion of the gate, I prefer to provide two rods, one near each end of the platform, and when the platform is depressed the gate through the intermediate connections is thereby raised to a vertical position, so as to prevent the animal from passing thereby. Suitable means, such as a spring, is provided for holding the gate normally in its depressed condition.

Other objects and advantages will be set forth in the following description, while the novelty thereof will constitute the basis of the claims succeeding said description, and said invention is clearly illustrated in the accompanying drawings, forming a part of this specification, and in which—

Figure 1 is a side elevation of a cattle-guard gate constructed in accordance with my invention and showing the manner of using the same. Fig. 2 is a sectional side elevation of the same. Fig. 3 is a plan view thereof.

Like characters refer to like parts in all the figures of the drawings.

Referring to the drawings, the numeral 2 indicates cross-ties, and 3 the rails laid thereupon.

The gate is shown at 4, and it consists of three alined wings secured to the rock-shaft 5, the intermediate wing being longer than the other wings and being mounted for swinging movement in a plane between said rails. The other wings are carried upon the rock-shaft outside the said rails. The rock-shaft is preferably mounted for oscillation upon one of the ties beneath the rails.

A platform is shown at 6, it being adapted to have a rising-and-falling movement and adapted when depressed by the animal stepping thereon to raise through intermediate connections the gate 4 to a vertical position, so as to prevent the animal passing by said gate. The platform is preferably supported below the rails, and between the ties and rods, as 7, are connected with the opposite ends thereof and extend toward the gate, said rods having intermediate their ends upwardly-extending projections 8, connected to cranks 9 upon the ends of the rock-shaft 5, and in the present case these projections consist of loops, and preferably the cranks consist of eyes 10, which are adapted to receive the bights of the looped projections 8. The free ends of the rods 7 extend through the elongated vertically-disposed slots 11, formed in one of the ties, by reason of which said loops are properly guided on the ascending and descending movement of the platform. It will be at once evident that when the animal steps upon the platform 6 the same will be lowered and the rods 7 will be moved in a corresponding direction, so that the projections thereof, being in engagement with the cranks 9, will operate the rock-shaft 8, so as to move the gate to a perpendicular position, and thereby prevent the animal from going beyond the same. I provide means for positively lowering the gate when the weight has been taken from the platform and will now describe one form thereof.

Upon the tie 2, in which the slots 11 are formed, I fasten a bracket 12, to the upper side of which I secure in some suitable manner one end of the downwardly-curved bowed spring 13, suitably connected at its opposite end to the intermediate wing of the gate 4 at a point at one side of the rock-shaft. When the gate is swung to a vertical position in the manner set forth, the bowed spring 13 will be put under compression, so that the instant the animal backs off the platform 6 the spring is free to move downward, and as it does so it will pull the gate therewith, so that the same will be moved to a flat position below the upper surfaces of the rails 3.

The invention is not limited to the exact construction hereinbefore set forth, for many variations may be adapted within the scope of my claims.

Having described my invention, what I claim is—

1. A rock-shaft, a gate carried thereby, a platform mounted for rising-and-falling movement, a rod rigidly secured to the platform and suitably guided at its free end, and provided with an upwardly-extending projection and a crank connected with the rock-shaft and also with said projection.

2. A rock-shaft, a gate carried thereby, a platform mounted for rising-and-falling movement, a rod rigidly connected with the platform and suitably guided at its free end, and having an upwardly-extending loop between said ends, and a crank-eye connected with said rock-shaft and adapted to receive the bight of said loop.

3. A rock-shaft, a gate carried thereby, a platform mounted for rising-and-falling movement, a rod rigidly connected with said platform and suitably guided at its free end, and provided with an upwardly-extending projection, a crank connected with said rock-shaft and also with the said projection, and a downwardly-extending bowed spring connected with the gate at one side of said rock-shaft.

4. A rock-shaft, a gate carried thereby, a platform mounted for rising-and-falling movements, a rod rigidly connected with the platform and suitably guided at its free end, and having an upwardly-extending projection, a crank connecting with said rock-shaft and also with said projection, and means for holding the gate in its normal position.

In testimony whereof I have hereunto set my hand in presence of two subscribing witnesses.

JOHN JACKSON.

Witnesses:
L. M. COOK,
J. A. CHOFFIN.